July 31, 1934.   E. F. NORELIUS   1,968,419
TRANSMISSION MECHANISM
Filed Sept. 10, 1930   3 Sheets-Sheet 1
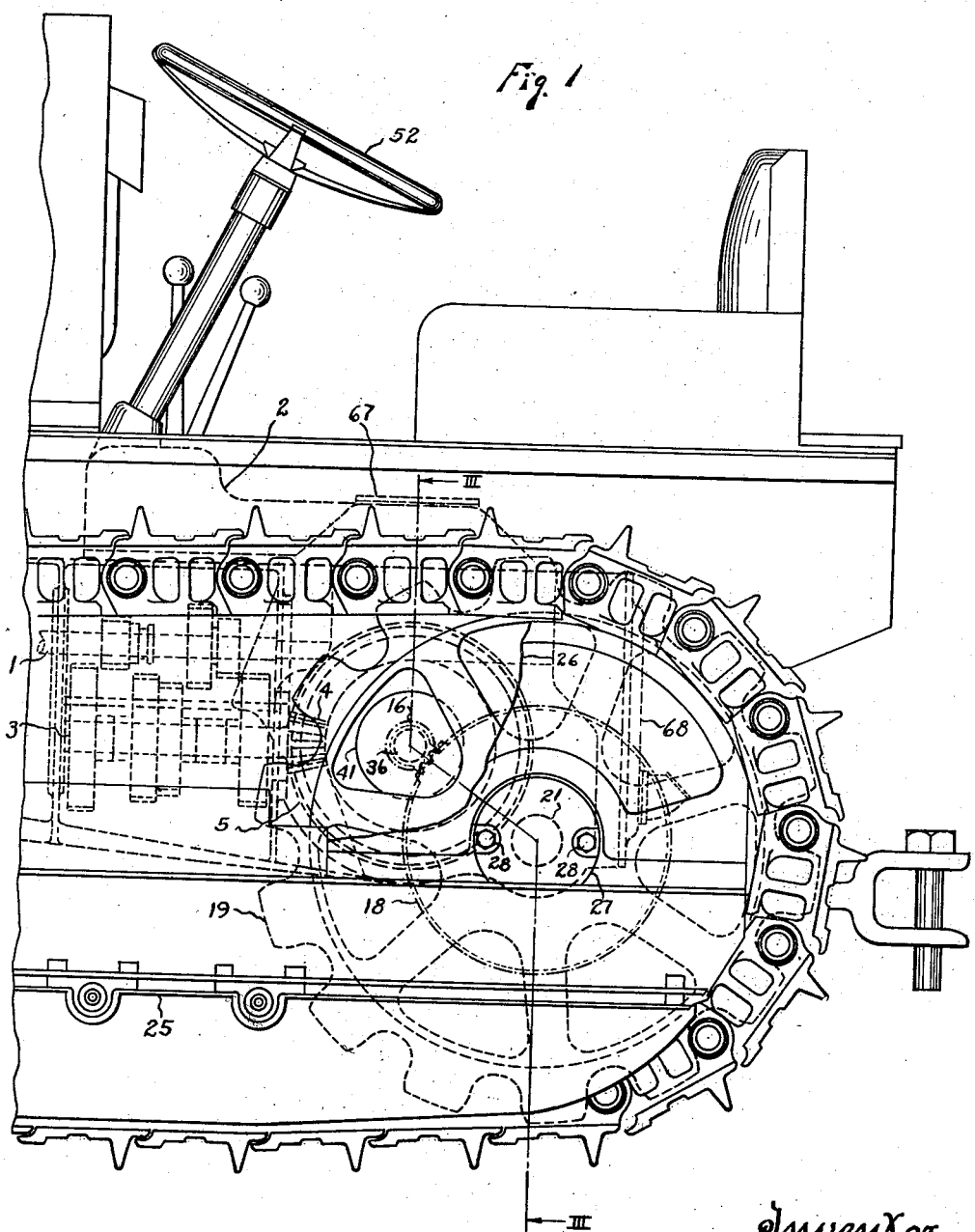

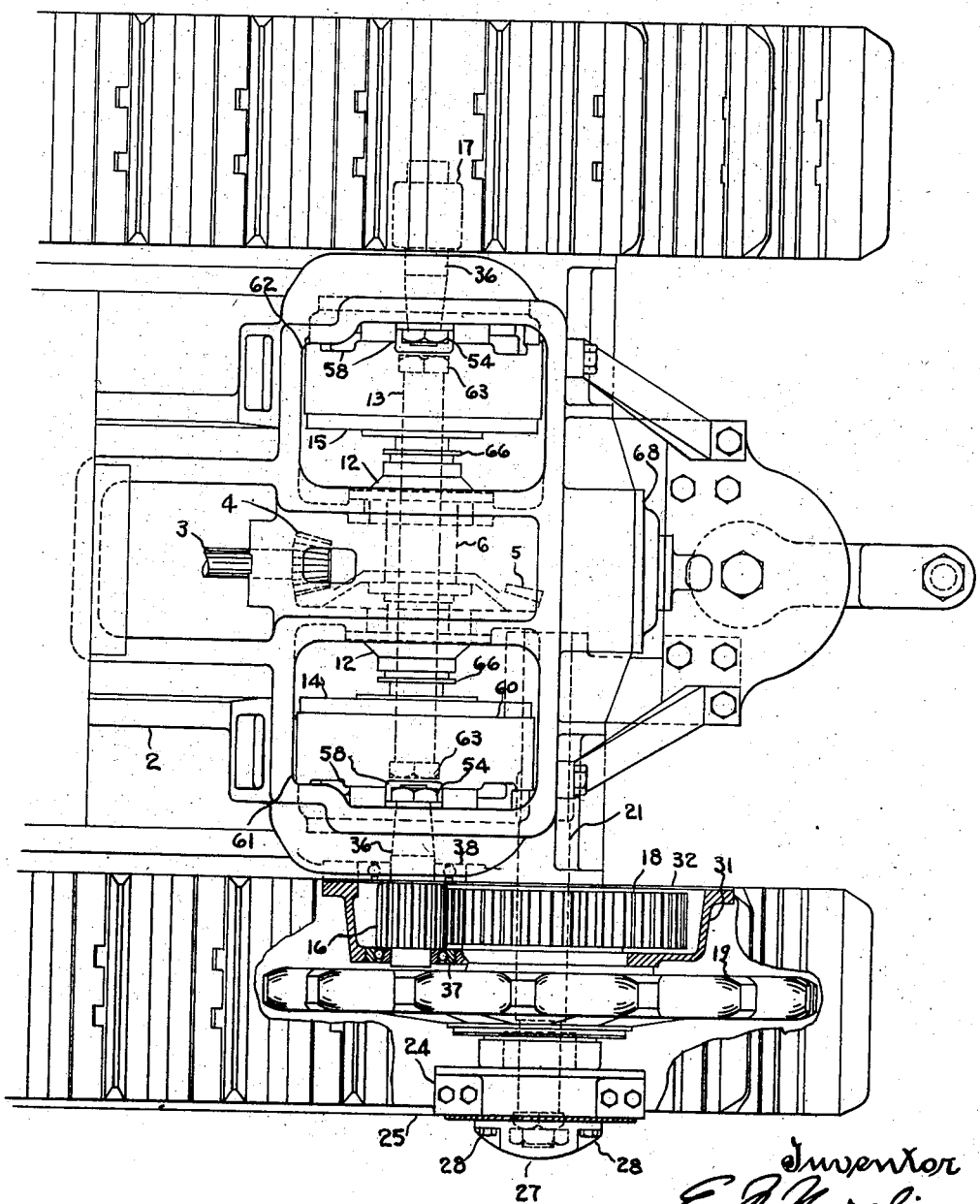

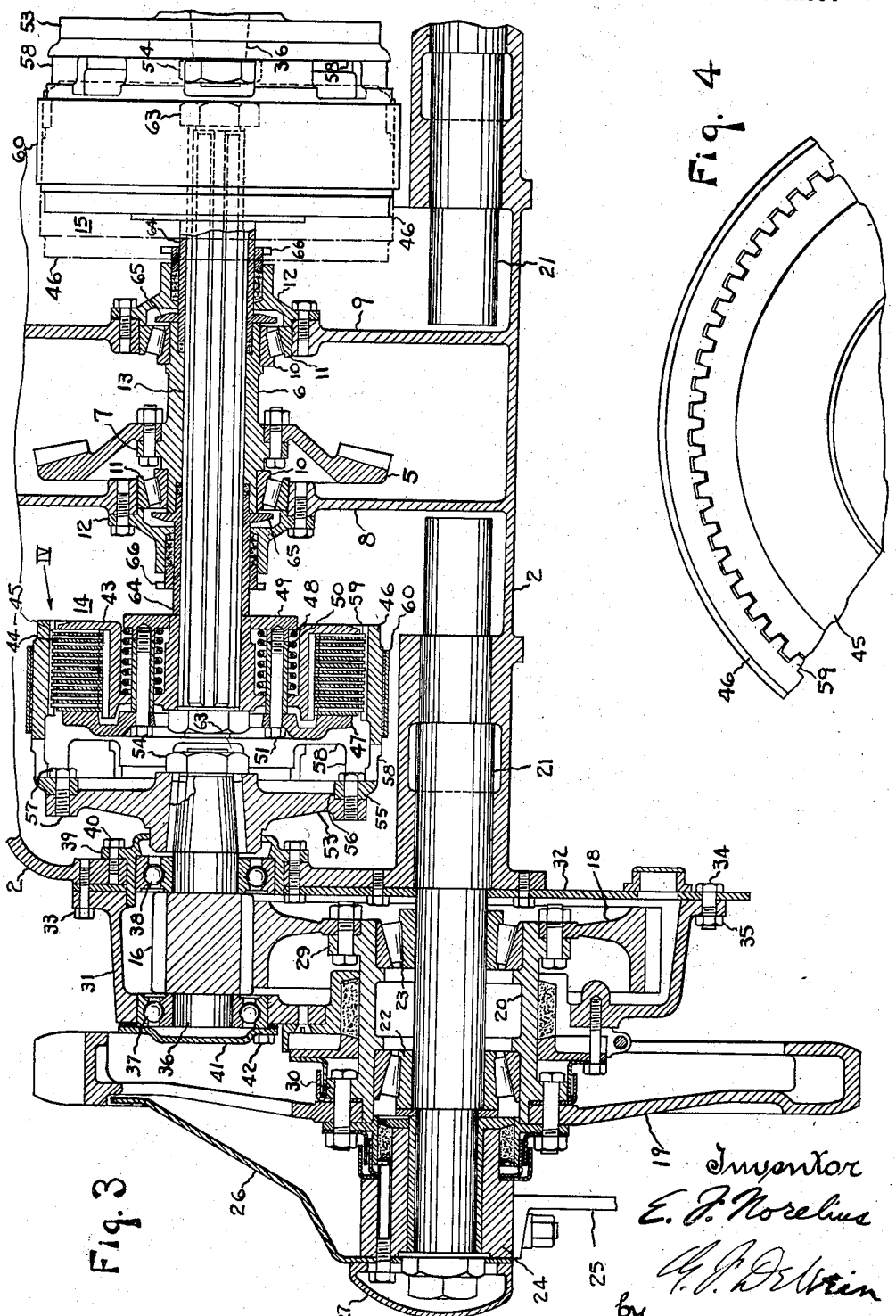

Patented July 31, 1934

1,968,419

UNITED STATES PATENT OFFICE 1,968,419

TRANSMISSION MECHANISM

Emil F. Norelius, Springfield, Ill., assignor to Allis-Chalmers Manufacturing Company, Milwaukee, Wis., a corporation of Delaware Application September 10, 1930, Serial No. 480,958

10 Claims. (Cl. 180—9.2)

This invention relates to a transmission mechanism particularly adapted for use in vehicles of the self-laying track type.

These vehicles are commonly equipped with a pair of steering clutches interposed at a suitable location between the drive sprockets and the speed change mechanism, and associated with the steering clutches are brakes which enable the operator of the vehicle to make a sharp turn by applying either one of the brakes corresponding to the direction in which the turn is to be made. Owing to the frequent use to which these parts are subject it is necessary to reline the brakes and inspect the clutches after a certain period of service, and it is desirable, therefore, to arrange them in such a manner that they are easily accessible and removable without substantial interference with other parts of the vehicle.

It is an object of the invention to provide a transmission mechanism of a design which allows removal of the steering clutches and their associated parts in an easy manner without the necessity of removing the drive sprocket wheels or the track belts.

A further object of the invention is to provide improvements in vehicles of the indicated type, which facilitate removal, inspection and replacement of the sprocket wheel drive pinions which are connected with the driven sides of the steering clutches.

Another object of the invention is to provide a transmission mechanism which is simple and compact in construction and efficient in operation.

These and other objects and advantages of the present invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Fig. 1 is a side elevation of the rear end of a tractor.

Fig. 2 is a top elevation of the tractor rear end shown in Fig. 1, the driver's seat and the covers of the transmission housing being removed.

Fig. 3 is a view showing a section on line III—III of Fig. 1.

Fig. 4 is a fragmentary view looking in the direction of arrow IV in Fig. 3, and showing a portion of a steering clutch in an enlarged scale.

Referring to Fig. 1 of the drawings, 1 indicates the power shaft of a speed changing mechanism of a tractor. 2 indicates a housing comprising a forward portion extending substantially longitudinally of the tractor, and a rearward portion extending substantially transversely of the tractor, the forward portion of the housing 2 enclosing the power shaft 1 and counter shaft 3 of the speed changing mechanism. The rearward portion of the housing 2, as will be seen from Fig. 2 of the drawings, is substantially wider, transversely of the tractor, than the forward portion, and has right and left end walls facing, respectively, the right and left track units, the end walls being connected with the forward portion of the housing and with each other by a wall extending transversely to the end walls. The counter shaft 3 of the speed changing mechanism has mounted on its rearward end a bevel pinion 4 which meshes with a bevel gear 5 located in the rearward portion of the housing 2. The bevel gear 5 is of the ring type and is supported by a tubular shaft or sleeve member 6 which is rotatably mounted in the rearward portion of the housing 2. Referring to Fig. 3 of the drawings it will be seen that the tubular shaft 6 has a collar 7 to which the bevel gear 5 is secured by means of bolts and nuts. Arranged within the rearward portion of the housing 2 are web portions 8 and 9 dividing said rearward portion substantially into three compartments, viz: a central compartment enclosing the bevel gear 5 and a lateral compartment at each side of the central compartment. Suitable openings are provided in the web portions 8 and 9 for mounting therein the outer races 11 of conical roller bearings, the inner races 10 of which are fitted upon the ends of the tubular shaft 6. The tubular shaft 6 is thus entirely sustained within the housing by the web portions 8 and 9 and, in order to permit the tubular shaft to be put in place, the openings in the web portions are of such size that the collar 7 may pass through one of them or the other while the tubular shaft, being first brought into one of the lateral compartments, is axially moved in place. After the tubular shaft has been brought in position between the partitions the conical roller bearings may then be put in place, or the roller bearing remote from the lateral compartment from which the tubular shaft is moved into the central compartment may first be put in place, then the tubular shaft inserted and finally the roller bearing adjacent to the lateral compartment from which the tubular shaft is moved into the central compartment may be put in place. Each of the roller bearings is retained by a suitable shoulder on the tubular shaft 6 and by a shield 12 bolted to the respective web portion 8 or 9.

The tubular shaft 6 is splined inside and engages a spline shaft 13, to be called a driving shaft, extending through the tubular shaft and projecting therefrom at both ends. In alinement with the spline shaft and operatively connected thereto by means of steering clutches 14 and 15 is a pair of driven shafts 36 having pinions 16 and 17, respectively, mesh with spur gears 18 connected to the tractor drive sprocket wheels 19. Both sprocket wheels 19 are secured to hubs 20 which are rotatably mounted on stub shafts 21 fastened to the transmission housing 2, and extending from the end walls thereof in opposite directions. Conical roller bearings 22 and 23 mounted on the stub shaft 21 and cooperating with the hub 20, at each side of the tractor, prevent the hubs 20 from axial displacement.

The stub shafts 21 also provide a means to support the main frame of the tractor on the truck units generaly indicated by 25. As will be seen from Figs. 2 and 3, each stub shaft 21 has an outer end embraced by a bearing 24 secured to the main channel of the adjacent truck unit 25. A mud guard 26 shown in Figs. 1 and 3, and a cap 27 covering the end of the stub shaft 21 are held in place by bolts 28 screwed into the bearing 24 at each side of the tractor.

Each of the hubs 20 has, near its inner end, a collar 29 to which the spur gear 18 is secured by means of bolts as shown in Fig. 3. A similar collar 30 is provided near the outer end of each hub 20, to which collar the sprocket wheel 19 at the respective side of the tractor is bolted as shown. Disposed between each sprocket wheel 19 and the end wall of the transmisison housing 2 facing the sprocket wheel is a casing 31 enclosing the spur gear and pinion at the respective side of the tractor. The inner end of the casing 31 is closed by a plate 32, and the upper portion of the casing, of the plate and the transmission housing are held together by bolts 33, while the lower portions of the casing and of the plate, projecting downwardly beyond the transmission housing, are held together by bolts 34 and nuts 35. The pinion shaft 36 at each side of the tractor is rotatably supported at its outer end in a ball bearing 37 mounted in the casing 31, and the portion of the shaft 36 which projects into the housing 2 through the end wall thereof at the respective side of the tractor is rotatably supported in another ball bearing 38 mounted in an opening in said end wall. The outer race of the ball bearing 38 is fitted into a ring 39 which is secured to the transmission housing 2 by means of bolts 40. The opening in the casing 31 in which the ball bearing 37 is mounted is closed by a cover 41 which is fastened to the end wall of the casing by means of bolts 42.

The steering clutches which have been mentioned hereinbefore are of a particular design. A driving clutch element 43 has a hub member which is splined on the end of the spline shaft 13, and a drum portion carrying a plurality of inner clutch disks 44 which alternate with outer clutch disks 45. The inner clutch disks are operatively engaged by the drum portion of the clutch element 43 while the outer clutch disks are operatively engaged by a drum 46. The stack of disks is held together by a pressure plate 47 and springs 48 which are seated with one end on the clutch element 43 and press against a plate 49 slidable on a recessed portion of the hub member of the clutch element 43. The plate 49 and the pressure plate 47 are spaced apart by tubular distance pieces 50 and held together by bolts 51 extending through the distance pieces 50. In order to release the clutch the plate 49 is pushed in axial direction so as to compress the springs 48, a suitable mechanism, not shown in the drawings and operated by the steering wheel 52, being provided for this purpose. The hub member of the driving clutch element 43 is held in place on the spline shaft 13 by a nut 63 screwed on a threaded portion at the end of the shaft. The inner end of the hub engages a sleeve 64 embracing the spline shaft 13 and projecting into the tubular shaft 6. A collar 65 on the inner end of the sleeve 64 engages the outer end of the tubular shaft 6 so that by tightening the nuts 63 the tubular shaft, the two sleeves 64 adjacent to its ends and the hubs 43 on both ends of the spline shaft are firmly held together. A packing gland 66 cooperates with the shield 12 to seal the joint between the sleeve 64 and the shield, whereby lubricant enclosed in the central compartment formed within the housing 2 by the web portions 8 and 9 is prevented from entering the lateral compartments in which the steering clutches are located.

The drum 46 is connected to a disk 53 having a hub member fitted on the tapered end of the pinion shaft 36 and held thereon by a nut 54 which is screwed on a threaded portion of the pinion shaft 36. The drum 46 has an inwardly projecting flange 55 which engages a shoulder 56 of the disk 53. The drum 46 and the disk 53 are held together by bolts 57 which are screwed into tapped holes of the disk 53. The bolt heads engage the inwardly projecting flange 55 and, in order to make them accessible, the drum 46 is provided with openings 58 suitably arranged to expose the bolt heads. On its inside the drum 46 has longitudinally extending keys 59 which engage external teeth of the outer clutch disks 45, as is more clearly shown in Fig. 4. A brake band 60 is placed around the outer surface of the drum 46 and is operated by any suitable mechanism not shown in the drawings. The transmission housing 2 has two large openings 61 and 62 directly above the clutches 14 and 15, respectively, and the disk 53, drum 46, driving clutch member 43 and its associated parts, including the clutch disks 44 and 45, of the steering clutch 14 may be brought into the housing through the opening 61 and may be removed therefrom through said opening, while the corresponding parts of the steering clutch 15 may be brought into and removed from the housing 2 through the opening 62. Either opening 61 or 62 may also be used for bringing the tubular shaft 6 into the rearward portion of the housing 2, that is, into one of the lateral compartments thereof, from where it may be brought to its place between the web portions 8 and 9 in the manner described hereinbefore. The openings 61 and 62 also afford access to the bolts 57 the latter being exposed, as stated, by suitably located openings in the drums 46. Covers 67 indicated in Fig. 1 are provided to close the openings 61 and 62.

The transmission mechanism described hereinbefore may be disassembled in the following manner. By removing the cover 67 above the clutch 14 the bolts 57 holding the drum 46 and the disk 53 together are made accessible. After removing these bolts through the holes 58 the drum may be pushed in axial direction towards the other clutch 15 so as to make the nut 54 accessible. The position of the drum, in which the nut 54 is accessible is indicated in Fig. 3 by dash dotted lines for the clutch 15. It will be noted that the drum portion of the clutch element 43 overhangs the nut 63 at the end of the spline shaft and that the pressure plate 47, in its position shown in the left hand part of Fig. 3, encircles or overlies said nut. Both, the drum portion of the clutch element 43 and the pressure plate 47, however, are axially spaced from the inner face of the disk 53 and from the hub portion of said disk, and the pressure plate 47 is so shaped that, when the flange 55 of the drum 46 has been moved into contact with the pressure plate 47, the nut 54 at the end of the pinion shaft 36 is exposed so that it may be reached with a wrench through the large opening in the housing 2, above the clutch. After unscrewing the nut 54 the pinion shaft 36 is free for axial separation from the disk 53. After removing the mud guard 26 and the cover 41 and after the sprocket wheel 19 has been turned into a position in which the space between two spokes registers with the opening in the casing 31 occupied by the ball bearing 37, the pinion shaft may now be pushed out of the housing 2 in axial direction and, if the pinion is formed integrally with the pinion shaft as shown, the ball bearing 37 will, of course, come out of the casing 31 together with the shaft and pinion. The ball bearing 38 may remain in place although, if desired, it can also be removed by unscrewing the bolts 40 and taking out the ring 39. After removal of the pinion shaft from the hub of disk 53 the disk 53 may then be taken out of the housing 2 through the large opening therein above the clutch. The next step of the disassembly is the removal of nut 63 at the end of the drive shaft 13 facing the opening in the end wall of housing 2 from which the pinion shaft has been removed. This may be accomplished by bringing the socket of a socket wrench upon the nut 63 through the opening 61 and by turning said socket by means of a handle inserted through the now available openings in the casing 31 and ball bearing 38. By removing the pinion shafts on both sides of the tractor in the described manner, and by removing at least one of the nuts 63 the spline shaft 13 is made free to be pushed out of the transmission housing in axial direction. This will allow removal of the clutches 14 and 15 through the openings 61 and 62, respectively, while the tubular shaft 6 and the sleeves 64 are left in the housing. The sleeves 64 may be removed by unbolting the shields 12 whereupon the sleeves and the shields may be taken out through the openings 61 and 62, respectively. The tubular shaft 6 may now also be removed it being only necessary to unbolt the bevel gear 5 from the collar 7 so that the tubular shaft can be moved in axial direction into one of the lateral compartments from which it may be removed through the respective opening 61 or 62 of the transmission housing. The roller bearing in the web portion 8 or 9 towards which the tubular shaft 6 is moved will come out together with the tubular shaft 6. Finally the bevel gear 5 which remains in the central compartment between the web portions 8 and 9 while the tubular shaft 6 is being removed therefrom may be taken out of the housing after removing the cover 68 indicated in Fig. 2, which cover closes a vertically disposed opening in the rearward portion of the housing 2 sufficiently large to permit removal of the bevel gear 5.

It will be seen that the described disassembling process allows removal of the final drive pinions, the steering clutches and the final bevel gear while the track belt units, the tractor drive sprockets and the casing for the final drive pinion and the cooperating spur gear are kept in place.

It should be understood, however, that it is not intended to limit the invention to the exact details of construction herein shown and described, for various modifications within the scope of the claims may occur to persons skilled in the art.

It is claimed and desired to secure by Letters Patent:

1. In a vehicle drive mechanism, a housing, a gear wheel journaled outside of said housing, a pinion meshing with said gear wheel, a shaft associated with said pinion and projecting into said housing, a wheel rim of a diameter larger than the diameter of said gear wheel arranged concentrically with the latter, a supporting structure for said wheel rim drivingly connected with said gear wheel and having an opening therein adapted to be alined with the axis of said pinion shaft, a power driven shaft journaled in said housing in alinement with said pinion shaft, and a clutch mechanism for connecting and disconnecting said pinion shaft and said power driven shaft, said clutch mechanism comprising a first hub member engaging said pinion shaft, retaining means cooperating with said pinion shaft and said first hub member to prevent relative displacement thereof in axial direction, said pinion shaft being axially removable from said housing through said opening in said rim supporting structure after removal of said retaining means, a second hub member secured to said power driven shaft, clutch means including a drum portion secured to one of said hub members and overlying said retaining means, and connecting means for holding said drum portion secured to its associated hub member, said housing having an apertured portion affording access to said connecting means and to said retaining means, the latter becoming directly accessible after removal of said drum portion from its associated hub member.

2. In a vehicle drive mechanism, a housing, a gear wheel journaled outside of said housing, a pinion meshing with said gear wheel, a shaft associated with said pinion and projecting into said housing, a wheel rim of a diameter larger than the diameter of said gear wheel arranged concentrically with the latter, a supporting structure for said wheel rim drivingly connected with said gear wheel and having an opening therein adapted to be alined with the axis of said pinion shaft, a power driven shaft journaled in said housing in alinement with said pinion shaft, and a clutch mechanism comprising, a first hub member engaging one of said shafts, a second hub member engaging the other of said shafts, said hub members being relatively spaced apart in axial direction, means including a retaining element for holding said pinion shaft and its associated hub member in axially fixed relation to each other, a drum portion encircling said second hub member in radially spaced relation thereto and overlying said retaining element, clutch disks in said radial space between said drum portion and said second hub member and adapted to engage to form a driving connection between said drum portion and said second hub member, and connecting means for detachably securing said drum portion to said first hub member, said housing having an apertured portion affording access to said connecting means and to said retaining element, the latter becoming accessible by removal of said drum portion from said first hub member, and said pinion shaft, after release of said retaining element, being removable from its associated hub member and from said housing by shifting it together with its pinion outwardly in the direction of its axis and through said opening in said rim supporting structure.

3. In a vehicle drive mechanism, a housing, a gear wheel journaled outside of said housing, a pinion meshing with said gear wheel, a shaft associated with said pinion and projecting into said housing, a wheel rim of a diameter larger than the diameter of said gear wheel arranged concentrically with the latter, a supporting structure for said wheel rim drivingly connected with said gear wheel and having an opening therein adapted to be alined with the axis of said pinion shaft, a power driven shaft journaled in said housing in alinement with said pinion shaft, and a clutch mechanism comprising, clutch means including clutch disks and a support therefor secured to said power driven shaft, a hub member engaging said pinion shaft, said clutch means and said hub member being relatively spaced apart in axial direction, means including a retaining element at the side of said hub member facing to said power driven shaft for preventing said hub member and its associated shaft from moving axially relative to each other, a drum portion cooperating with said clutch means and overlying said retaining element, and connecting means for detachably securing said drum portion to said hub member, said housing having an apertured portion affording access to said connecting means and to said retaining element, the latter becoming accessible by removal of said drum portion from its associated hub member, and said pinion shaft, after release of said retaining element, being removable from said hub member and from said housing by shifting it together with its pinion outwardly in the direction of its axis through said opening in said rim supporting structure.

4. In a transmission mechanism, a housing having oppositely disposed end walls and a side wall connecting said end walls, each of said end walls having an opening therein, a rotatable drive shaft mounted within said housing and having its axis passing through the openings in said end walls, a pair of axially spaced driving clutch elements within said housing, each operatively connected to said drive shaft coaxially therewith, said drive shaft being adapted to be withdrawn from both of said driving clutch elements by axial shifting of said drive shaft relative thereto towards one of said end walls and through the opening therein, a rotatable driven shaft at each end of said drive shaft, detachably mounted in operative position in and passing through the opening in the end wall next thereto, a driven clutch element within said housing detachably connected to each driven shaft in operative association with the driving clutch element next thereto, each of said driven shafts being adapted to be withdrawn axially from the driven clutch element mounted thereon and from the opening in the respective end wall through which it passes, said side wall of said housing being apertured so as to permit removal of said driven clutch elements and of said driving clutch elements therethrough when said driven shafts and said driving shaft are removed from operative association with said clutch elements, respectively.

5. In a transmission mechanism, a housing having oppositely disposed end walls and a side wall connecting said end walls, each of said end walls having an opening therein, a drive shaft within said housing and having an axis of rotation passing through the openings in said end walls, each end of said drive shaft being axially spaced from the end wall of said housing next thereto, bearing means within said housing, rotatably supporting said drive shaft, a pair of axially spaced driving clutch elements within said housing, each having a hub member detachably connected to said drive shaft coaxially therewith and in axially spaced relation to said bearing means, said drive shaft being adapted to be axially withdrawn from said bearing means and from both of said hub members of said driving clutch elements by axial shifting of said drive shaft relative thereto towards one of said end walls and through the opening therein, a rotatable driven shaft at each end of said drive shaft, detachably mounted in operative position in and passing through the opening in the end wall next thereto, a driven clutch element within said housing detachably connected to each driven shaft in operative association with the driving clutch element next thereto, each of said driven shafts being adapted to be withdrawn axially from the driven clutch element mounted thereon and from the opening in the respective end wall through which it passes, said side wall of said housing being apertured so as to permit removal of said driven and driving clutch elements therethrough when said driven shafts and said driving shaft are removed from operative association with said clutch elements, respectively.

6. In a transmission mechanism, a housing having oppositely disposed end walls and a side wall connecting said end walls, each of said end walls having an opening therein, a drive shaft within said housing, having an axis of rotation passing through the openings in said end walls, a sleeve member embracing a portion of said drive shaft intermediate its ends, each end of said drive shaft being axially spaced from the end wall of said housing next thereto, a support for said sleeve member within said housing, said sleeve member being rotatably mounted on said support and held thereby in operative position independently of said drive shaft, a pair of axially spaced driving clutch elements within said housing, each having a hub member detachably connected to said drive shaft in axially spaced relation to said support, said drive shaft being adapted to be withdrawn from said sleeve member and from both of said hub members of said driving clutch elements by axial shifting of said drive shaft relative thereto towards one of said end walls and through the opening therein, a rotatable driven shaft at each end of said drive shaft, detachably mounted in operative position in and passing through the opening in the end wall next thereto, a driven clutch element within said housing detachably connected to each driven shaft in operative association with the driving clutch element next thereto, each of said driven shafts being adapted to be withdrawn axially from the driven clutch element mounted thereon and from the opening in the respective end wall through which it passes, said side wall of said housing being apertured so as to permit removal of said driven and driving clutch elements therethrough when said driven shafts and said driving shaft are removed from operative association with said clutch elements, respec- 7. In a transmission mechanism, a housing having oppositely disposed end walls and a side wall connecting said end walls, each of said end walls having an opening therein, a rotatable drive shaft mounted within said housing and having its axis passing through the openings in said end walls, each end of said drive shaft being axially spaced from the end wall of said housing next thereto, a pair of driving hub members within said housing, each detachably connected to said drive shaft, one at each end thereof, said drive shaft being adapted to be axially withdrawn from both of said driving hub members by axial shifting of said drive shaft relative thereto towards one of said end walls and through the opening therein, a rotatable driven shaft at each end of said drive shaft, detachably mounted in operative position in and passing through the opening in the end wall next to the respective end of said drive shaft, a driven hub member within said housing detachably connected to each driven shaft and adjacent to the driving hub member next thereto, each of said driven shafts being adapted to be withdrawn axially from the driven hub member mounted thereon and from the opening in the respective end wall through which it passes, and clutch devices for selectively connecting and disconnecting each driven hub member and its adjacent driving hub member, each of said clutch devices comprising a first drum portion associated with one of the relatively adjacent hub members, a second drum portion encircling said first drum portion and detachably secured to the other of the relatively adjacent hub members, and friction means associated with said first and second drum portions, said side wall of said housing being apertured so as to permit removal of said first and second drum portions and of their associated friction means and hub members through said side wall when said driven shafts and said driving shaft are removed from operative association with said hub members, respectively.

8. In a transmission mechanism, a housing having a first aperture, a rotatable driving shaft element within said housing having its axis passing through said first aperture, supporting means detachably associated with said driving shaft element for supporting the latter in operative position, a driving clutch element within said housing detachably connected to said driving shaft element, the latter being adapted to be withdrawn from said supporting means and from said driving clutch element by axial shifting of said driving shaft element relative to said supporting means and driving clutch element towards and through said first aperture, a rotatable driven shaft element having an end portion projecting into said housing through said first aperture therein, supporting means detachably associated with said driven shaft element for supporting said driven shaft element in operative position, a driven clutch element within said housing detachably connected to said end portion of said driven shaft element, in operative association with said driving clutch element, retaining means for preventing said driven shaft element from axial displacement relative to said driven clutch element in the direction from said driven clutch element towards the aperture through which said driven shaft element projects into said housing, said retaining means being removable from said driven shaft element so as to permit removal of said driven shaft element from said driven clutch element and from said housing by axial shifting of said driven shaft element relative to said driven clutch element towards and through said first aperture in said housing, said housing having a second aperture permitting removal of said driving and driven clutch elements therethrough when said driving and driven shaft elements are removed from operative association with said clutch elements, respectively.

9. In a transmission mechanism, a housing having an end wall and an opening therein and a wall portion extending transversely to said end wall, a rotatable drive shaft within said housing having its axis passing through said opening and having an end portion within said housing next to said opening in axially spaced relation to said end wall, supporting means detachably associated with said drive shaft in axially spaced relation to said end portion thereof for supporting said drive shaft in operative position, a driving hub member within said housing detachably connected to said end portion of said drive shaft next to said end wall, said drive shaft being adapted to be axially withdrawn from said supporting means and from said driving hub member by axial shifting of said drive shaft relative to said supporting means and through said hub member towards said end wall and through the opening in the latter, a rotatable driven shaft having an end portion projecting into said housing through the opening in said end wall thereof, supporting means detachably associated with said driven shaft in axially spaced relation to said end portion thereof, for supporting said driven shaft in operative position, a driven hub member within said housing, detachably connected to said end portion of said driven shaft, the latter being adapted to be withdrawn from said driven hub member and from said housing by axial shifting of said driven shaft relative to said driven hub member towards said end wall and through said opening in the latter, a first drum portion associated with one of said hub members, a second drum portion encircling said first drum portion and detachably secured to the other of said hub members, and friction means associated with said first and second drum portions, said housing having, in addition to said opening in said end wall thereof, another opening in said transversely extending wall portion thereof proportioned to permit removal of said first and second drum portions and of their associated friction means and hub members therethrough when said driving and driven shafts are removed from operative association with said hub members, respectively.

10. In a transmission mechanism, a housing having an end wall and an opening therein and a wall portion extending transversely to said end wall, a rotatable drive shaft within said housing having its axis passing through said opening and having an end portion within said housing next to said opening in axially spaced relation to said end wall, supporting means detachably associated with said drive shaft in axially spaced relation to said end portion thereof for supporting said drive shaft in operative position, a driving hub member within said housing detachably connected to said end portion of said drive shaft next to said end wall, said drive shaft being adapted to be axially withdrawn from said supporting means and from said driving hub member by axial shifting of said drive shaft relative to said supporting means and through said hub member towards said end wall and through the opening in the latter, a rotatable driven shaft having an end portion projecting into said housing through the opening in said end wall thereof, supporting means detachably associated with said driven shaft in axially spaced relation to said end portion thereof for supporting said driven shaft in operative position, a driven hub member within said housing at the side of said driving hub member facing said end wall, fastening means at the side of said driven hub member facing said driving hub member for detachably securing said driven hub member to said driven shaft, said driven shaft being adapted, after unfastening of said fastening means, to be withdrawn from said driven hub member and from said housing by axial shifting of said driven shaft in the direction from said driven hub member towards said end wall and through the opening in the latter, a first drum portion associated with one of said hub members, a second drum portion detachably secured to the other of said hub members and encircling said first drum portion and said fastening means, and friction means associated with said first and second drum portions, said housing having, in addition to said opening in said end wall thereof, another opening in said transversely extending wall portion thereof proportioned to permit removal of said first and second drum portions and of their associated friction means and hub members therethrough when said driving and driven shafts are removed from operative association with said hub members, respectively.

EMIL F. NORELIUS.